United States Patent [19]

Striffler

[11] Patent Number: 5,416,977
[45] Date of Patent: May 23, 1995

[54] PITCH SENSOR SYSTEM

[75] Inventor: Foster L. Striffler, New London, Conn.

[73] Assignee: The United States of America as represented by the Secretary of the Navy, Washington, D.C.

[21] Appl. No.: 217,511

[22] Filed: Mar. 24, 1994

[51] Int. Cl.$^6$ .................................................. G01C 9/06
[52] U.S. Cl. ................................. 33/366; 33/377
[58] Field of Search ................. 33/366, 377, 390; 340/689

[56] References Cited

U.S. PATENT DOCUMENTS

| 2,936,411 | 5/1960 | Doty | 33/366 |
| 3,487,303 | 12/1969 | Remington | 33/366 |
| 4,624,140 | 11/1986 | Ekchian et al. | 33/366 |
| 4,800,542 | 1/1989 | Franklin et al. | 33/366 |

FOREIGN PATENT DOCUMENTS

| 0053810 | 3/1985 | Japan | 33/366 |
| 0120214 | 5/1988 | Japan | 33/366 |
| 0142315 | 6/1991 | Japan | 33/390 |
| 8105592 | 7/1983 | Netherlands | 33/366 |
| 2211942 | 7/1989 | United Kingdom | 33/366 |
| 1137298 | 1/1985 | U.S.S.R. | 33/366 |

*Primary Examiner*—Thomas B. Will
*Attorney, Agent, or Firm*—Michael J. McGowan; Prithvi C. Lall; Michael F. Oglo

[57] ABSTRACT

A very small pitch sensor which accurately measures angular rotation about the pitch axis while being substantially insensitive to angular rotations about the roll or yaw axes. The pitch sensor comprises a spherical cavity that is fluid filled. The fluid fill further comprises one half conductive fluid and one half dielectric fluid. The fluids are selected to be immiscible and of different densities. The inside of the spherical cavity is segmented into three surface areas for connection to an electronic circuit. The electronic circuit measures voltage differentials between the segmented surface areas which vary with the conductive fluid surface in contact with the respective segmented areas. The conductive fluid surface contact area varies with the angular rotation of the cavity and about the pitch axis.

13 Claims, 4 Drawing Sheets

PITCH SENSOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a pitch sensor system and more particularly to a very small sensor that, in combination with a sensing circuit, measures angular rotation about the pitch axis while remaining insensitive to angular rotations about the yaw or roll axis.

(2) Description of the Prior Art

It is well known that there are commercially available sensors which use a mass on the end of a pendulum, the rotating shaft at the upper end of the pendulum being geared to a resistance potentiometer which then varies resistance in proportion to roll induced pendulum motion. Vertical gyros and inertial platforms have also been used to sense motion about a vertical axis. Also, electrolytic switches have been used to sense tilt. Both the pendulum devices and the gyros and inertial platforms devices are very large. In addition, the pendulum is undesirable in that it responds to cross axis motion while the gyros and inertial platforms are very complicated and expensive devices. The electrolytic switch devices sense only discrete tilt values, typically providing a constant signal when tilted from a preset state through any angle.

SUMMARY OF THE INVENTION

Accordingly, it is a general purpose and object of the present invention to provide a pitch sensor of small size.

It is a further object that such sensor be relatively insensitive to roll or yaw motions.

Another object is that such sensor be deployable in towed acoustic arrays.

A further object is that such device be low in cost.

A still further object is that the output of such device vary in proportion to the pitch angle.

These objects are accomplished with the present invention by providing a very small pitch sensor which accurately measures angular rotation about the pitch axis while being insensitive to angular rotations about the roll or yaw axis. The pitch sensor comprises a spherical cavity that is fluid filled. The fluid fill further comprises one half conductive fluid and one half dielectric fluid, the fluids being selected to be immiscible and of different densities. The inside of the spherical cavity is segmented into three surface areas for connection to an electronic sensing circuit. The electronic circuit measures voltage differentials between the segmented surface areas which vary with angular rotation of the cavity about the pitch axis.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
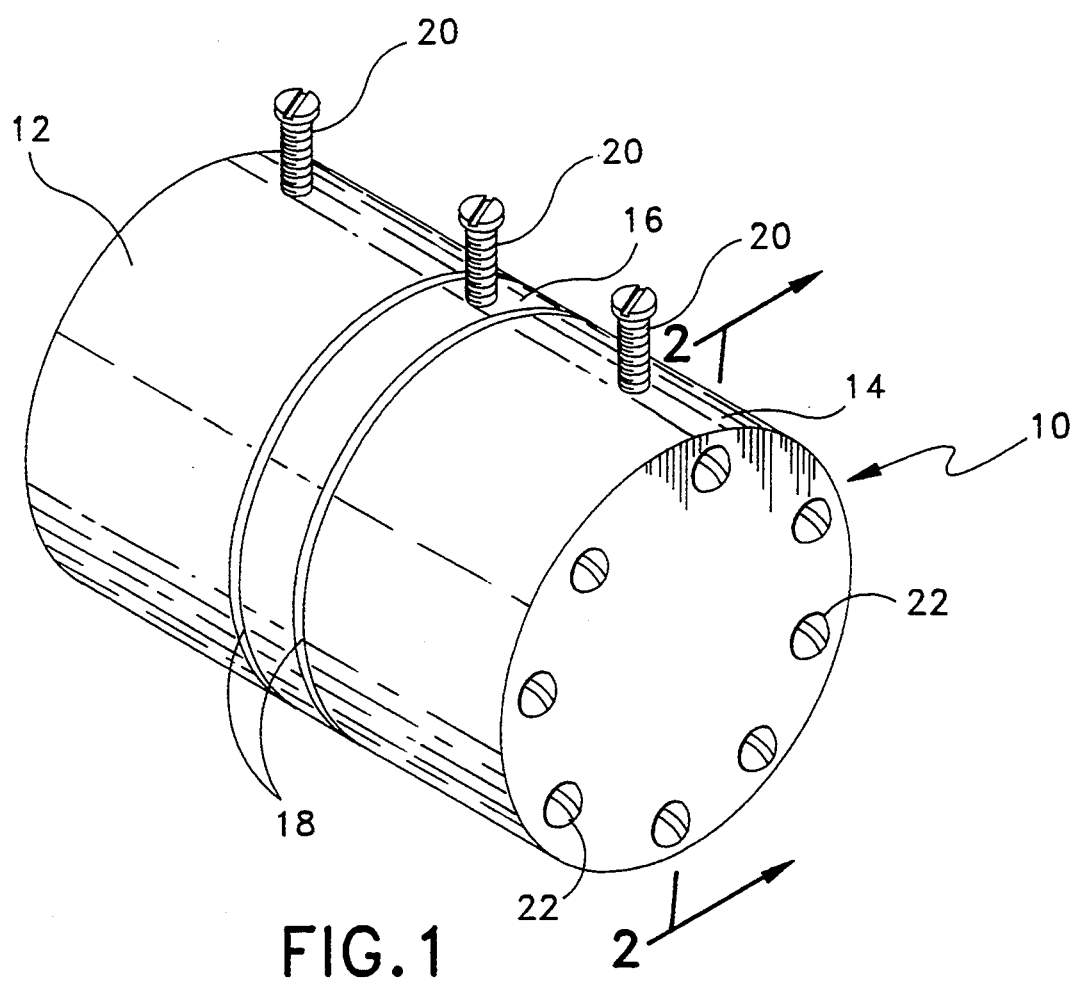
FIG. 1 shows a perspective view of the pitch sensor of the present invention.

Referring now to FIG. 1 there is shown a sensor 10 that measures rotation in pitch and does not respond to any angular offset in either roll or yaw. Sensor 10 further comprises a first cylindrical end 12 and a second cylindrical end 14. Positioned between ends 12 and 14 is a ring 16, separated from ends 12 and 14 by two electrical insulators 18. End 12, end 14 and ring 16 can be made of any conductive material. Three terminal-post screws 20 are affixed to sensor 10 in general alignment, one each being disposed in end 12, end 14 and ring 16. A plurality of nonconductive fasteners 22 are spaced around the periphery of and pass through end 14, insulators 18, ring 16, threading into end 12 such that when fasteners 22 are secured the resulting assembly is as shown in FIG. 1.

Figure 2:
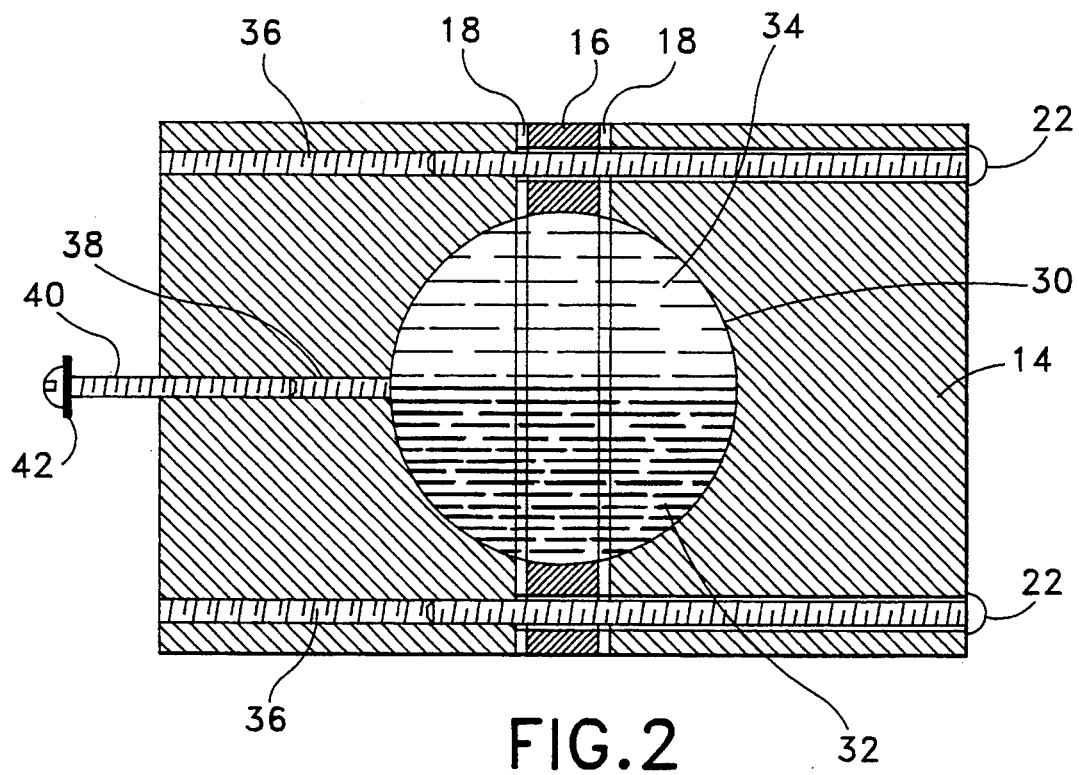
FIG. 2 shows a cross-sectional view of the pitch sensor of FIG. 1 taken along line 2—2 thereof.

FIG. 2 shows a hollow sphere 30, extending into end 12 and end 14 and having its center coinciding with the center of ring 16. Sphere 30 is completely filled with conductive fluid 32 and nonconductive dielectric fluid 34, such that conductive fluid 32 occupies one half of the inside volume of sphere 30 and nonconductive dielectric fluid 34 occupies the other half of sphere 30. Fluids 32 and 34 are selected to be immiscible and to further have different densities. Dielectric fluid 34 is shown as floating on top of conductive fluid 32, fluid 32 being heavier and remaining on the bottom. Nonconducting dielectric fluid 34 can be mineral oil or the like as long as it provides damping for sensor 10. Conductive fluid 34 can be silver nitrate in an aqueous solution or the like, the conductivity being somewhat controllable by changing the concentration of the solution. Threaded holes 36 extend through ends 12 and 14, through ring 16 and insulators 18, and accept nonconductive fasteners 22. A fill port 38 extends through end 12 to sphere 30 along the center line of end 12, such that fluids 32 and 34 can be introduced into sphere 30 through fill port 38. Fill port 38 is sealed once fluids 32 and 34 have filled sphere 30. Fill port 38 can be sealed in any manner known to the art, such as slotted threaded fastener 40 with compressible washer 42, shown partially inserted into fill port 38. The method of sealing is chosen so as to not affect the conductance or interior volume of sphere 30.

Figure 3:
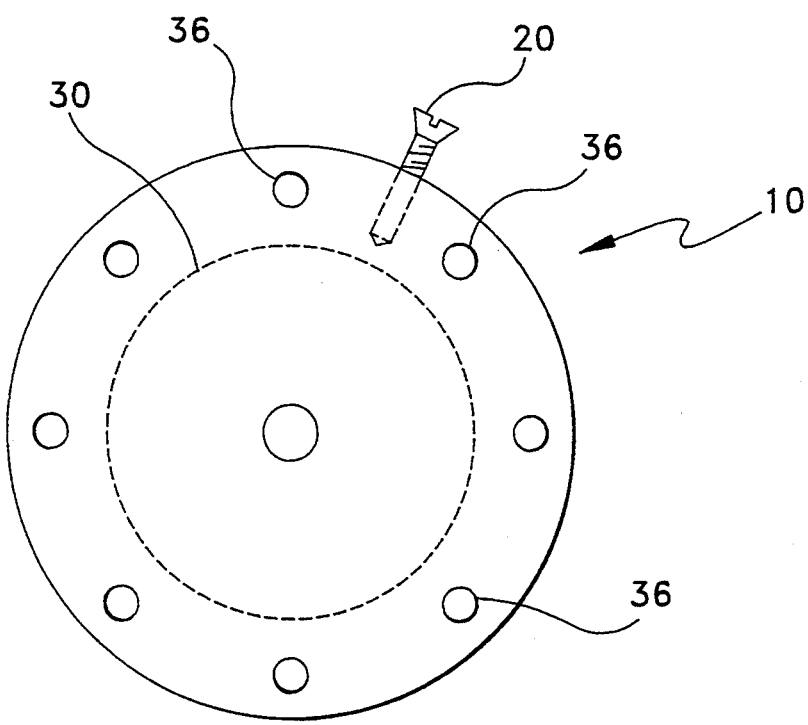
FIG. 3 shows an end view of the pitch sensor of FIG. 1.

FIG. 3 shows conductive terminal-post screws 20 extending into and affixed to sensor 10 in a position between threaded holes 36. The length of terminal-post screws 20 extending into sensor 10 is such as to provide electrical connection between sensor 10 and terminal-post screws 20, and to not intersect with sphere 30 so as not to affect the conductance or interior volume of sphere 30.

Figure 4:
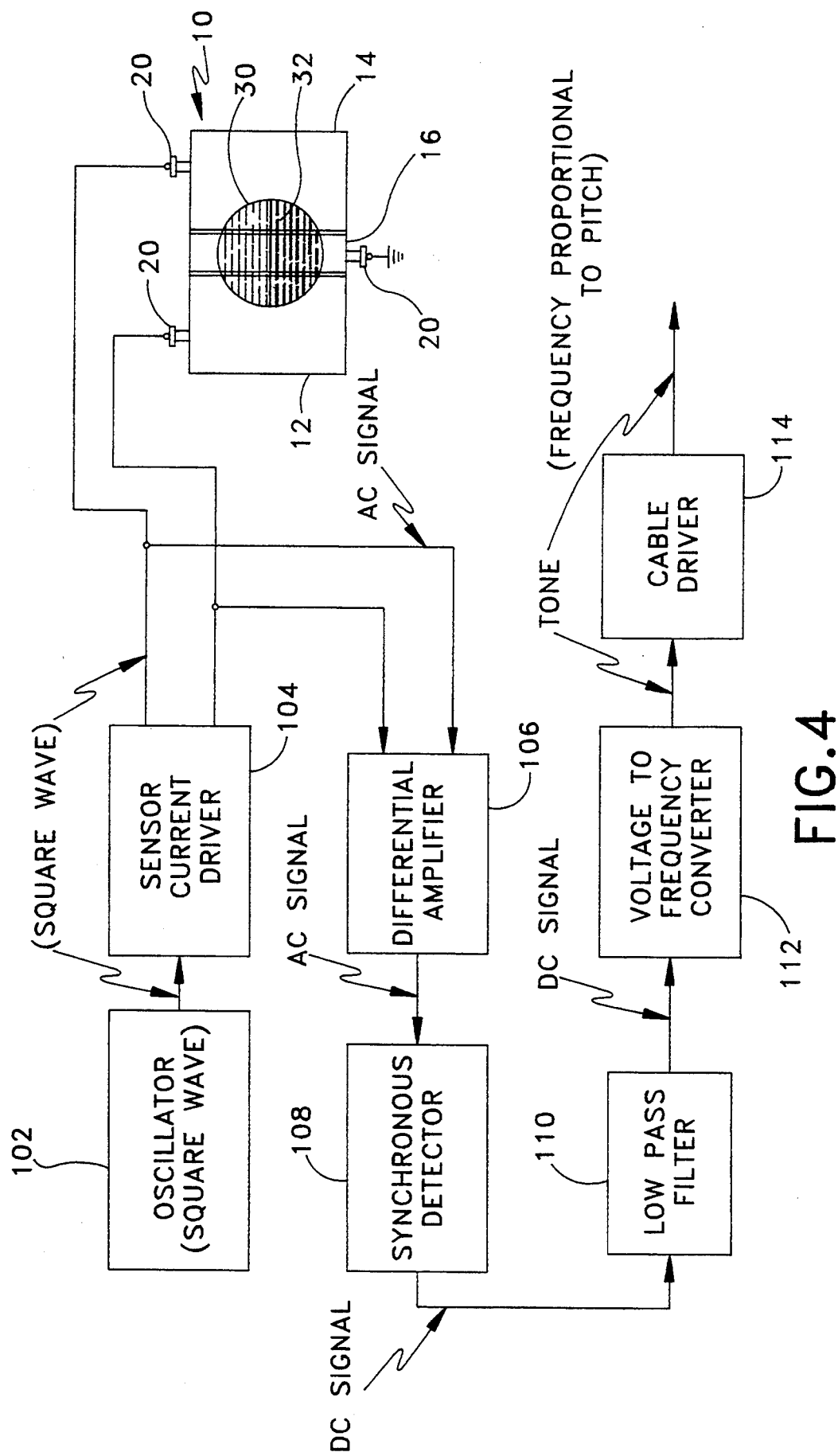
FIG. 4 shows a block diagram of the circuit of the present invention.
Figure 5:
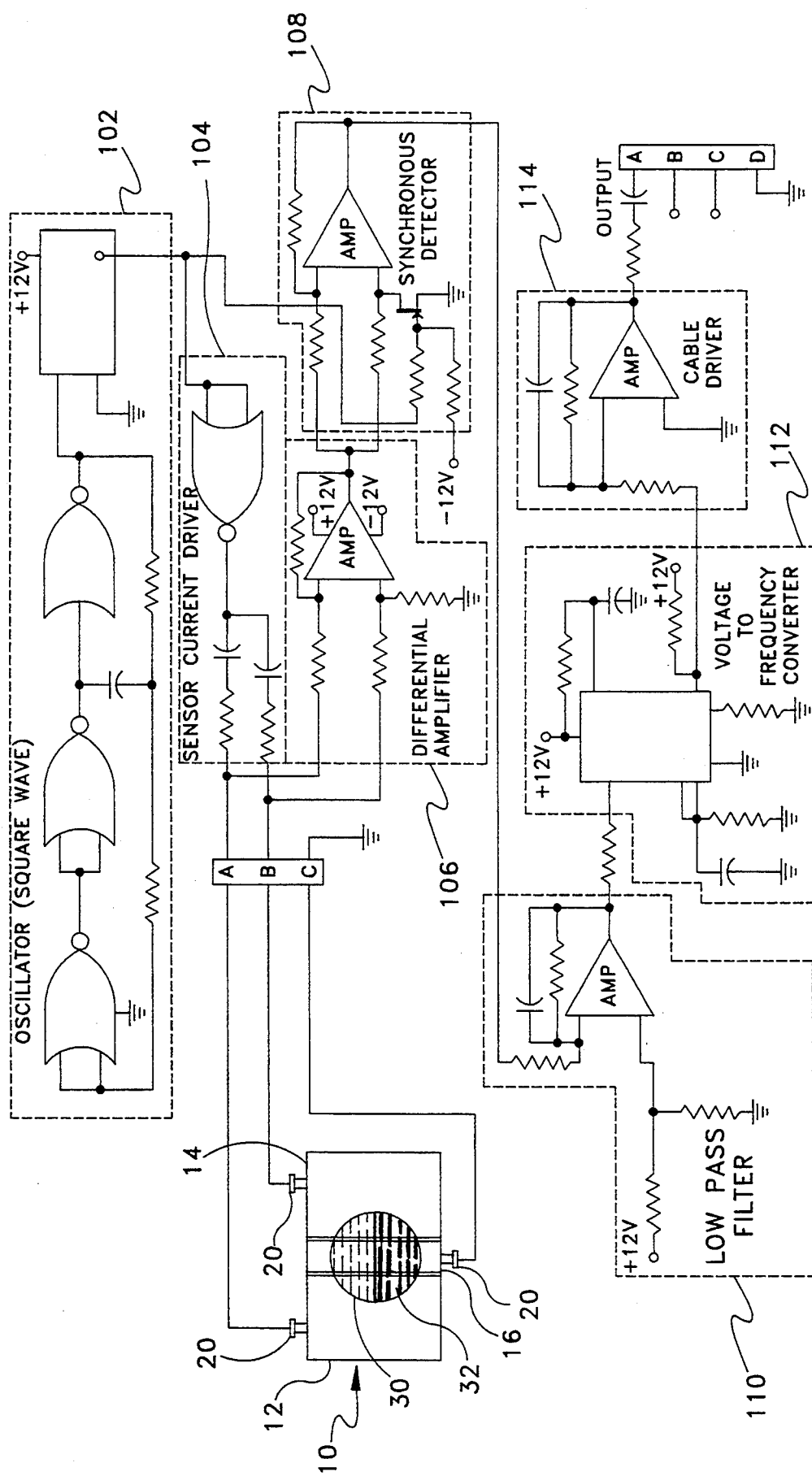
FIG. 5 shows a circuit diagram implementation of the block diagram of FIG. 4.

FIG. 4 shows a block diagram of the electronics for sensor 10, and FIG. 5 shows a circuit diagram implementation of the block diagram of FIG. 4. Square wave oscillator 102 generates a fixed frequency square wave signal. Sensor current driver 104 provides two constant current drive circuits which supply constant currents to ends 12 and 14 of pitch sensor 10. AC current is used for the sensing signal in order that the conductive surfaces do not become polarized or have electroplating taking place thereon. Ring 16 is connected to ground. Because the sensing currents supplied to ends 12 and 14 are constant currents, the voltages at terminal-post screws 20 vary with the resistances seen at terminal-post screws 20. The resistances vary directly with the conductances between end 12 and ring 16 and between end 14 and ring 16. With the pitch angle set at zero the conductance between end 12 and ring 16 is the same as the conductance between end 14 and ring 16 and the voltages at terminal-post screws 20 are the same. Now, when sensor 10 pitches in either direction, the area of one end of sensor 10 in contact with conductive fluid 32 increases while the area of the opposite end of sensor 10 in contact with conductive fluid 32 correspondingly decreases. The area of ring 16 in contact with conducting fluid 32 remains constant. The conductances between ring 16 and ends 12 and 14 correspond to the area of conductive fluid 32 in contact with ends 12 and 14, respectively, and the area of conductive fluid 32 in contact with ends 12 and 14 corresponds to the angle of pitch of sensor 10. The voltages at terminal-post screws 20 vary corresponding to the conductances. Therefore, the amplitude of the signals at terminal-post screws 20 of pitch sensor 10 varies as pitch sensor 10 is rotated about the pitch axis. Because of the spherical shape of sphere 30, any rotation in the roll direction does not cause a change in the area covered by conductive fluid 32 and thus no change in the voltages at terminal-post screws 20. The voltages at terminal-post screws 20 vary only with rotation about the pitch axis and do not vary with rotation about the roll axis. Differential amplifier 106 amplifies the algebraic difference of the signals at end 12 and end 14. For instance, when the pitch sensor is exactly horizontal the amplitude of the two signals are exactly equal and the difference is exactly zero. As the pitch sensor rotates in the positive sense the positive signal will be larger than the negative signal and the output of differential amplifier 106 is a positive signal, i.e., zero phase shift as compared to the reference signal. If the pitch sensor rotates in the negative sense then the negative signal is larger than the positive signal and the output of differential amplifier 106 has a phase shift of 180 degrees as compared to the reference signal. Synchronous detector 108 generates a DC voltage proportional to the AC signal at the input. The DC signal is positive for zero phase shift signals and negative for signals with a phase shift of 180 degrees. Low pass filter 110 filters out any high frequency noise, such as any residual components of the square wave driver signal. The resulting DC signal can be used directly to indicate the pitch angle of the pitch sensor. Voltage to frequency converter 112 is used to transmit the DC signal over long distances. Voltage to frequency converter 112 outputs a signal whose frequency corresponds to the DC voltage and the frequency is therefore directly proportional to the pitch of the pitch sensor. Cable driver 114 is a very low output impedance amplifier that supplies power to drive a long cable. It can be seen from FIG. 5 that oscillator 102, sensor current driver 104, differential amplifier 106, synchronous detector 108, low pass filter 110, voltage to frequency converter 112, and cable driver 114 are electronic components well known in the art.

What has thus been described is a very small pitch sensor which accurately measures angular rotation about the pitch axis while being insensitive to angular rotations about the roll or yaw axis. The pitch sensor comprises a spherical cavity that is completely filled with equal portions of immiscible conductive and dielectric fluids. The inside of the spherical cavity is segmented into three surface areas for connection to an electronic circuit which measures voltages across segments. The voltages across segments vary with the surface areas of each segment in contact with the conductive fluid, which in turn vary with the angular rotation of the cavity about the pitch axis. The electronic circuit converts the differences in voltages to an output signal varying with the angular rotation of the sensor about the pitch axis. The advantage of the pitch sensor over prior art sensors is that the present invention only responds to motion in the pitch direction and can be made very small for use in acoustic towed arrays.

Obviously many modifications and variations of the present invention may become apparent in light of the above teachings. For example, the size of the device is selected based upon the intended array diameter. Also, the fill fluids may be varied to achieve desired parameters, including having the dielectric more dense than the conductive fluid. The pitch sensor can be made of any material provided the segmented surface areas of the spherical cavity remain in alignment, are conductive, and each is independently connected to the electronic circuit. A conductive coating can be applied to the segmented surfaces of the spherical cavity to provide the electronic circuit paths required. The terminal post screws need not be posts or screws, but may be any means for providing an electrical connection between the device and the electronic circuit. Further, the electronic circuit can be made to sense the ratio of the voltages, a ratio of unity corresponding to a level state, ratios less than one corresponding to pitch in one direction and ratios greater than one corresponding to pitch in the other.

In light of the above, it is therefore understood that within the scope of the appended claims, the invention may be practiced otherwise than as specifically described.

What is claimed is:

1. A pitch sensor comprising:
    a housing;
    a spherical cavity contained within said housing, said cavity having a first segment, a second segment, and a third segment, said first and second segments being equal, diametrically opposed, partial hemispheres, said third segment being a ring segment separating said first and second segments, said first, second and third segments having conductive surfaces, said first, second and third segments being electrically isolated from each other, said third segment being electrically grounded;
    a nonconductive dielectric fluid completely filling one half of said spherical cavity;
    a conductive fluid completely filling the remaining half of said spherical cavity, said conductive fluid being immiscible with said nonconductive dielectric fluid, said conductive fluid having a density different from the density of said nonconductive fluid, said conductive fluid providing a first electrical path for electrical current between said first segment and said third segment, said first path having a first conductance proportional to the area of said conductive surface of said first segment in contact with said conductive fluid, said conductive fluid providing a second electrical path for electrical current between said second segment and said third segment, said second path having a second conductance proportional to the area of said conductive surface of said second segment in contact with said conductive fluid, said areas of said conductive surfaces in contact with said conductive fluid being proportional to the inclination of said spherical cavity with reference to a pitch axis, said pitch axis corresponding to the intersection of a first plane and a second plane, said first plane being the plane formed between said conductive and said nonconductive fluids, said second plane being the plane bisecting said third segment into two equal ring portions, said first and second conductances not changing with rotation about a roll axis or a yaw axis, said roll axis and said yaw axis being perpendicular to each other and perpendicular to said pitch axis, said roll axis and said yaw axis further passing through the center of said spherical cavity; and a sensing means, said sensing means electrically connected to said first, second and third segments, said sensing means having a first input corresponding to said first conductance of said first electrical path, said sensing means having a second input corresponding to said second conductance of said second electrical path, said sensing means having an output signal corresponding to differences in said first and second inputs, said output signal corresponding to the inclination of said spherical cavity about said pitch axis.

2. A pitch sensor according to claim 1 wherein said housing further comprises:

a fill port means for inserting said nonconductive and said conductive fluids into said spherical cavity, said fill port means comprising an aperture extending through said housing to said spherical cavity; and a sealing means for blocking said fill port means after insertion of said nonconductive and said conductive fluids into said spherical cavity, said sealing means maintaining said nonconductive and said conductive fluids within said spherical cavity.

3. A pitch sensor according to claim 1 wherein said housing comprises three conductive housing segments, said conductive housing segments corresponding to said spherical cavity segments, said housing segments being electrically isolated from each other, said conductive housing segments forming said conductive surfaces of said spherical cavity segments.

4. A pitch sensor according to claim 3 wherein said housing further comprises a first terminal-post for electrical connection of said first conductive housing segment to said sensing means, a second terminal-post for electrical connection of said second conductive housing segment to said sensing means, and a third terminal-post for electrical connection of said third conductive housing segment to said sensing means.

5. A pitch sensor according to claim 4 wherein said housing further comprises:

a fill port means for inserting said nonconductive and said conductive fluids into said spherical cavity, said fill port means comprising an aperture extending through said housing to said spherical cavity; and a sealing means for blocking said fill port means after insertion of said nonconductive and said conductive fluids into said spherical cavity, said sealing means maintaining said nonconductive and said conductive fluids within said spherical cavity.

6. A pitch sensor according to claim 1 wherein said sensing means further comprises:

a square wave oscillator means for generating a fixed frequency square wave signal;

a sensor current driver means, said sensor current driver means having an input signal corresponding to said square wave signal, said sensor current driver having a first constant electrical current output to said first electrical path, said sensor current driver having a second constant electrical current output to said second electrical path; and a differential amplifier means, said differential amplifier means having a first amplifier input corresponding to a first voltage potential across said first electrical path, said first voltage potential being proportional to said conductance of said first electrical path, said differential amplifier means having a second amplifier input corresponding to a second voltage potential across said second electrical path, said second voltage potential being proportional to said conductance of said second electrical path, said differential amplifier having an amplifier output signal corresponding to the algebraic difference of said first and said second voltage potentials, said algebraic difference being proportional to the rotation of said sensor about said pitch axis.

7. A pitch sensor according to claim 6 further comprising a synchronous detector means, said synchronous detector means having a detector input signal corresponding to said amplifier output signal, said synchronous detector means converting said detector input signal to a DC voltage output signal.

8. A pitch sensor according to claim 7 further comprising a low pass filter means, said low pass filter means having a filter input signal corresponding to said DC voltage output signal, said low pass filter means removing high frequency noise from said filter input, said low pass filter means having a filtered output signal corresponding to said DC voltage output signal.

9. A pitch sensor according to claim 8 further comprising:

a voltage to frequency converter, said converter receiving said filtered DC voltage output signal, said converter having a converter output signal whose frequency corresponds to said filtered DC voltage output signal; and a cable driver, said cable driver receiving said converter output signal, said cable driver amplifying said converter output signal, said cable driver driving said amplified converter output signal to a remote receiving unit.

10. A pitch sensor according to claim 9 wherein said housing further comprises:

a fill port means for inserting said nonconductive and said conductive fluids into said spherical cavity, said fill port means comprising an aperture extending through said housing to said spherical cavity; and a sealing means for blocking said fill port means after insertion of said nonconductive and said conductive fluids into said spherical cavity, said sealing means maintaining said nonconductive and said conductive fluids within said spherical cavity.

11. A pitch sensor according to claim 9 wherein said housing comprises three conductive housing segments, said conductive housing segments corresponding to said spherical cavity segments, said housing segments being electrically isolated from each other, said conductive housing segments forming said conductive surfaces of said spherical cavity segments.

12. A pitch sensor according to claim 11 wherein said housing further comprises a first terminal-post for electrical connection of said first conductive housing segment to said sensing means, a second terminal-post for electrical connection of said second conductive housing segment to said sensing means, and a third terminal-post for electrical connection of said third conductive housing segment to said sensing means.

13. A pitch sensor according to claim 12 wherein said housing further comprises:
- a fill port means for inserting said nonconductive and said conductive fluids into said spherical cavity, said fill port means comprising an aperture extending through said housing to said spherical cavity; and
- a sealing means for blocking said fill port means after insertion of said nonconductive and said conductive fluids into said spherical cavity, said sealing means maintaining said nonconductive and said conductive fluids within said spherical cavity.

* * * * *